US010152230B1

(12) United States Patent
Xiong et al.

(10) Patent No.: US 10,152,230 B1
(45) Date of Patent: *Dec. 11, 2018

(54) FILE-BASED REPLICATION TECHNIQUES

(71) Applicant: EMC IP Holding Company LLC, Hopkinton, MA (US)

(72) Inventors: Tianfang Xiong, Shanghai (CN); Yuanyang Wu, Shanghai (CN); Yifeng Lu, Shanghai (CN); Minghui Zhang, Shanghai (CN); Hongru Xu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/277,206

(22) Filed: Sep. 27, 2016

(51) Int. Cl.
G06F 3/06 (2006.01)
G06F 17/30 (2006.01)
(52) U.S. Cl.
CPC .......... *G06F 3/0604* (2013.01); *G06F 3/065* (2013.01); *G06F 3/067* (2013.01); *G06F 3/0643* (2013.01); *G06F 3/0644* (2013.01); *G06F 3/0659* (2013.01); *G06F 17/30174* (2013.01); *G06F 17/30215* (2013.01)
(58) Field of Classification Search
CPC ......... G06F 3/065; G06F 3/067; G06F 3/0619
See application file for complete search history.

(56) References Cited

U.S. PATENT DOCUMENTS 7,707,272 B1 * 4/2010 Aral .................. G06F 11/2064
709/216
2017/0147601 A1 * 5/2017 Kaushik ............ G06F 17/30115

OTHER PUBLICATIONS

Xiong, Tiang, et al., File System Snapshot Replication Techniques, U.S. Appl. No. 15/277,313, filed Sep. 27, 2016.

* cited by examiner

*Primary Examiner* — Edward J Dudek, Jr.
(74) *Attorney, Agent, or Firm* — Muirhead and Saturnelli, LLC

(57) ABSTRACT

Replication techniques for file-based replication. A first file pool and a second pool may be created, respectively, on a first site and a second site. Storage for the first file pool may be provisioned from a first storage device group configured as a first consistency group. Storage for the second file pool may be provisioned from a second storage device group configured as a second consistency group. Modification operations, such as writes, may be applied to the first file pool. The modifications performed on the first file pool result in corresponding modifications to the first consistency group. The modifications may be replicated on the second file pool by applying the modifications to the second consistency group. File systems created in the first and second file pools may be self-contained and modifications applied to the first and second consistency groups may be applied in a specified order to ensure write consistency.

20 Claims, 7 Drawing Sheets

FILE-BASED REPLICATION TECHNIQUES

BACKGROUND

Technical Field

This application generally relates to data storage.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the techniques herein is a method of performing replication comprising: creating a first file pool on a first site, wherein storage for said first file pool is provisioned from a first storage device group configured as a first consistency group; creating a second file pool on a second site, wherein storage for said second file pool is provisioned from a second storage device group configured as a second consistency group; performing writes to the first file pool; applying the writes to the first consistency group; and replicating the writes on the second file pool, wherein said replicating includes applying the writes to the second consistency group. The first file pool may include one or more first file systems. Each of the first file systems may be self-contained within only the first file pool whereby each of the first file systems does not extend into another file pool of the first site. The second file pool may include one or more second file systems. Each of the second file system may be self-contained within only the second file pool whereby each of the second file systems does not extend into another file pool of the second site. Each of the writes to the first file pool may result in modifying one or more portions of one or more storage devices of the first storage device group and each of the writes may be applied to the first storage device group in a specified sequential ordering. The replicating step may maintain write consistency between the first consistency group and the second consistency group by applying the writes to the second storage device group in the specified sequential ordering. The replicating step may perform synchronous replication of the writes from the first consistency group to the second consistency group. The synchronous replication may provide a same point in time copy of data in both the first consistency group and the second consistency group whereby the second storage device group mirrors the first storage device group. The replicating may perform asynchronous replication of the writes from the first consistency group to the second consistency group. The asynchronous replication may provide a first point in time copy of first data in the first consistency group and a second point in time copy of the first data in the second consistency group whereby the first storage device group includes a more recent up to date copy of the first data than the second storage device group. The replicating may be included in remote replication performed between the first consistency group of the first site and the second consistency group of the second site. The first site may be a first data storage system and the second site may be a second data storage system. The method may also include creating a new file system in the first file pool; and replicating the new file system in the second file pool by creating a copy of the new file system in the second file pool. The method may also include extending a first existing file system in the first file pool, wherein said extending includes allocating additional storage from the first storage device group for the first existing file system; and replicating, in the second file pool, said extending of the first existing file system, wherein the second file pool includes a copy of the first existing file system and said replicating in the second file pool includes allocating additional storage from the second storage device group for the copy of the first existing file system. The method may also include performing an operation that results in a modification to the first file pool, wherein the operation may include any one or more of: creating a new file, creating a new file system, modifying an existing file, modifying an existing file system, deleting an existing file, deleting an existing file system, writing to an existing file, extending an existing file, extending an existing file system, and performing a file-based operation that results in the modification to the first file pool. The first storage device group may include a first plurality of logical devices having storage provisioned from a first plurality of physical devices of the first consistency group, wherein each logical device of the first plurality may have all its provisioned storage included in the first plurality of physical devices of the first consistency group. The second storage device group may include a second plurality of logical devices having storage provisioned from a second plurality of physical devices of the second consistency group, wherein each logical device of the second plurality may have all its provisioned storage included in the second plurality of physical devices of the second consistency group.

In accordance with another aspect of techniques herein is a system comprising: a processor; and a memory comprising code stored thereon that, when executed, performs a method of data replication comprising: creating a first file pool on a first site, wherein storage for said first file pool is provisioned from a first storage device group configured as a first consistency group; creating a second file pool on a second site, wherein storage for said second file pool is provisioned from a second storage device group configured as a second consistency group; performing writes to the first file pool; applying the writes to the first consistency group; and replicating the writes on the second file pool, wherein said replicating includes applying the writes to the second consistency group.

In accordance with another aspect of techniques herein is a computer readable medium comprising code stored thereon that, when executed, performs a method of data replication comprising: creating a first file pool on a first site, wherein storage for said first file pool is provisioned from a first storage device group configured as a first consistency group; creating a second file pool on a second site, wherein storage for said second file pool is provisioned from a second storage device group configured as a second consistency group; performing writes to the first file pool; applying the writes to the first consistency group; and replicating the writes on the second file pool, wherein said replicating includes applying the writes to the second consistency group. The first file pool may include one or more first file systems and each of the first file system may be self-contained within only the first file pool whereby each of the first file systems does not extend into another file pool of the first site. The second file pool may include one or more second file systems and each of the second file systems may be self-contained within only the second file pool whereby each of the second file systems does not extend into another file pool of the second site.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
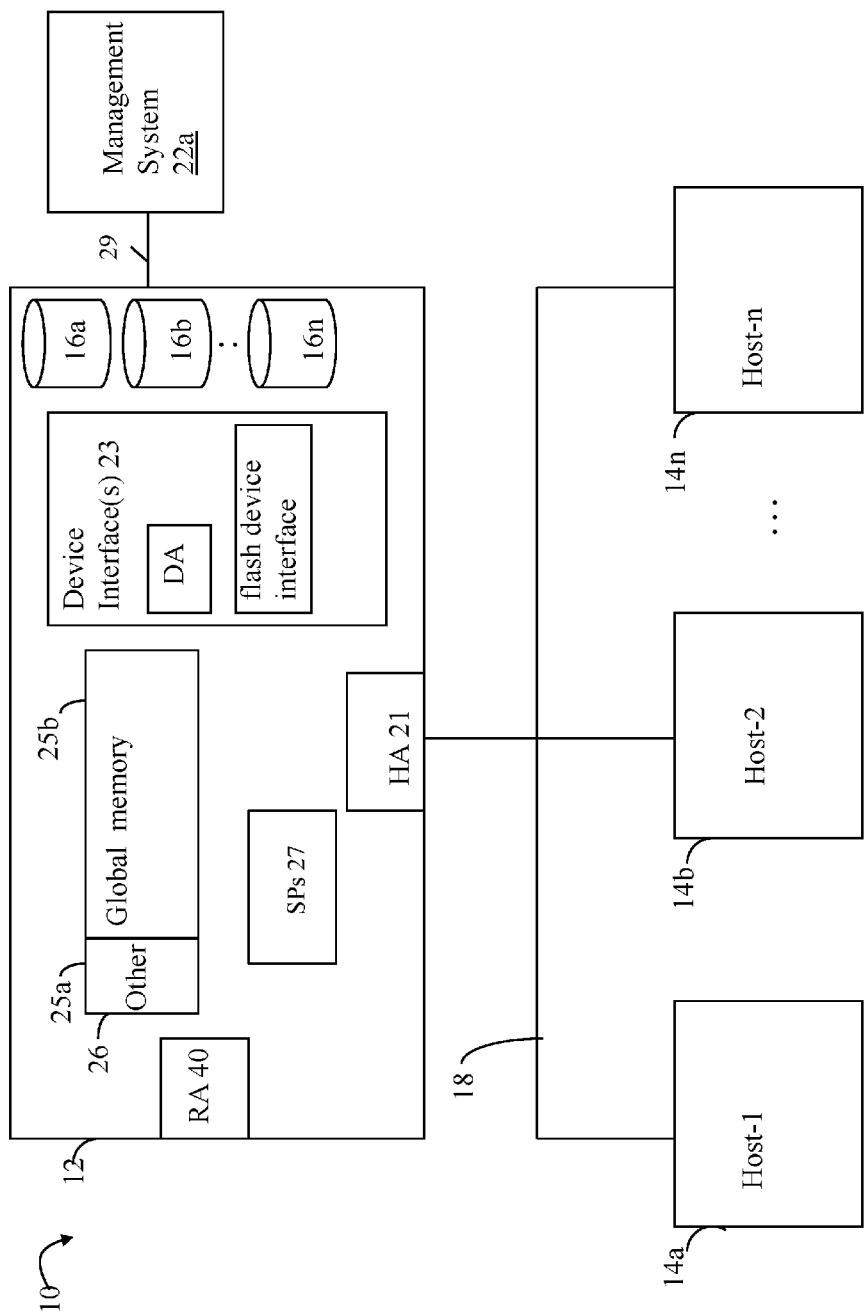
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of physical data storage devices (PDs or physical devices) such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration. For example, consistent with description elsewhere herein, an embodiment may define multiple storage tiers including one tier of PDs based on a first type of flash-based PDs, such as based on SLC technology, and also including another different tier of PDs based on a second type of flash-based PDs, such as MLC. Generally, the SLC PDs may have a higher write endurance and speed than MLC PDs.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN (s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Each of the different adapters, such as HA 21, DA or disk interface, RA, and the like, may be implemented as a hardware component including, for example, one or more processors, one or more forms of memory, and the like. Code may be stored in one or more of the memories of the component for performing processing.

An embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

In a data storage system, it is highly undesirable to have data that is stored thereon be unavailable/unreachable (DU) or otherwise experience a data loss (DL). As such, an embodiment in accordance with techniques herein may perform processing for data replication to replicate in an ongoing manner (e.g., create and maintain) a copy of data from a first site or location at a second remote site or location. In this manner, the remote site's copy of the data may be used in the event of a disaster, or more generally, data loss, at the first site. Described in following paragraphs are techniques that may be used in connection with remote replication whereby data from a first site, such as a first data storage system, is replicated in an ongoing manner over time on a second remote site, such as a second data storage system. The first and second sites may be separated geographically by a large distance. In connection with performing data replication, writes, or more generally, modifications, to the first site's data are replicated (e.g., applied) to the second site's copy of the data.

Techniques described in following paragraphs provide for file-based replication, for example, of a file pool and entities therein such as a file system. In connection with the replication such as using remote replication techniques, bit-for-bit physical copies or mirrors of data (e.g., file pool) from the first site are replicated on a second remote site for use, for example, in connection with data loss or disaster in connection with the first site. For example, for a file pool, and file systems and files contained therein, stored on the first site, operations applied thereto are also replicated at the second site on the copy of the file pool, and files and file systems contained therein. Such operations may generally include operations that modify the file pool or an entity of the file pool. For example, new file systems added to the file pool on the first site are replicated on the file pool copy on the second site; write I/Os to write data to a file of the file pool on the first site are replicated on the file pool copy of the second site; and an extension or allocation of additional storage for an existing file system of the file pool on the first site is replicated on the file pool copy of the second site.

As described in more detail below, techniques herein perform file-based replication by a particular mapping or relationship between the file pool and the LUNs upon which the file pool is established. In this manner, the particular mapping or relationship is between the file pool and its LUNs, and thus also between the backing PDs providing the provisioned physical storage for the LUNs of the file pool, on the first site. The LUNs of the first site providing the file pool storage may be configured in a first consistency group. On the second remote site, another set of LUNs providing the storage for the file pool copy may be similarly configured into a second consistency group whereby remote replication may be performed in an going manner between the first consistency group of LUNs of the first site and the second consistency group of the second site. Within a consistency group, writes, or more generally operations, such as I/Os or other modification operations, are applied in a specified ordering or time-order sequence. In this manner, the consistency group of LUNs may be characterized as reflecting a point in time version of the data stored thereon based on the particular modification operations performed in the sequence. For example, the first consistency group of LUNs A, B and C of the first site may have 4 write I/Os applied thereto—write 1 writes to LUN A, write 2 writes to LUN B, write 3 writes to LUN C, and write 4 writes to LUN A. The specified ordering or sequence of writes I/Os as applied to the first consistency group of LUNs is write 1, write 2, write 3, and write 4. On the second site, there may be a second consistency group including the same number of LUNs (e.g., 3) which are the same size or capacity as those in the first consistency group. The remote replication between the first and second consistency groups provides for applying the 4 write I/Os to the first consistency group in a specified ordering or sequence and applying the 4 write I/Os to the second consistency group in the same specified ordering or sequence (as applied to the first consistency group). In this manner, write consistency between the two consistency groups of the first and second sites may be maintained by applying the writes to the two consistency groups in the same specified ordering or sequence. The copy of the data as stored on the LUNs of the second consistency group.

In an embodiment using techniques described in following paragraphs, the combination of the mapping between the file pool and LUNs forming the consistency group on each of the first and second sites may be used achieve file-based replication of the file pool through the underlying replication of the underlying consistency group. In an embodiment in accordance with techniques herein, the mapping between the file pool and the underlying LUNs of the consistency group of each site may be in accordance with specified criteria. For example, the LUNs of the consistency group, and thus the PDs providing the physical storage of the LUNs (and thus for the consistency group and the mapped file pool) are only mapped to a single file pool. Thus, each LUN of the consistency group providing storage for the file pool is only mapped to a single file pool (e.g., a single LUN cannot have a first portion providing storage for a first mapped file pool and also a second portion providing storage for a second mapped file pool). Each of the one or more file systems of the file pool are also self-contained in that a single file system is only allowed to be contained within a single file pool (e.g., single file system cannot extend across multiple different file pools). In this manner in accordance with criteria noted above, techniques herein use a file pool formed from a group of one or more self-contained file systems having storage provided by LUNs which may also be characterized as self-contained or mapped to only the single file pool. Thus, techniques herein create a consistency group containing LUNs under the file pool where there is a one-to-one mapping between the file pools and the consistency groups of LUNs at the first and second sites. As a result, replication can be established and performed between the files pools of the first and second sites by replicating those modifications (as made to the underlying first consistency group of the first site) on the second underlying consistency group of the second site. Such replications may be performed in accordance with a specified order or sequence so as to maintain write consistency.

Consistent with other discussion herein, the replication between consistency groups of the two sites may apply modifications, such as writes, in the same specified sequence or ordering in order to maintain write consistency. An embodiment in accordance with techniques herein may perform synchronous replication or asynchronous replication. With synchronous replication, there is no delta or difference between the data copies on the first and second sites. In other words, the data copies maintained on the two sites (e.g., first or local site and second or remote site) mirror one another whereby the same modifications, such as the same writes, are applied to both copies on both sites so that the data copies on both sites denote the same point in time version of copy of the data. Synchronous replication may be contrasted with asynchronous replication where such strict synchronization or mirroring between the two data copies on the two sites is not required or guaranteed. With asynchronous replication, there may be a delta or different between the data copies on the two sites. For example, the first site may include the most recent or most up to date copy of the data with all modifications applied thereto. However, the second data copy at the second site may not have all modifications applied thereto so that the second data copy at the second point in time may represent an earlier version or point in time data copy than that of the first site. Following paragraphs may describe examples of techniques herein with synchronous replication for purposes of illustration. However, more generally as noted above, techniques herein may also be used with asynchronous replication techniques.

Described in following paragraphs and figures are a sequence of steps that may be performed in an embodiment in accordance with techniques to provide for file system replication.

Figure 2:
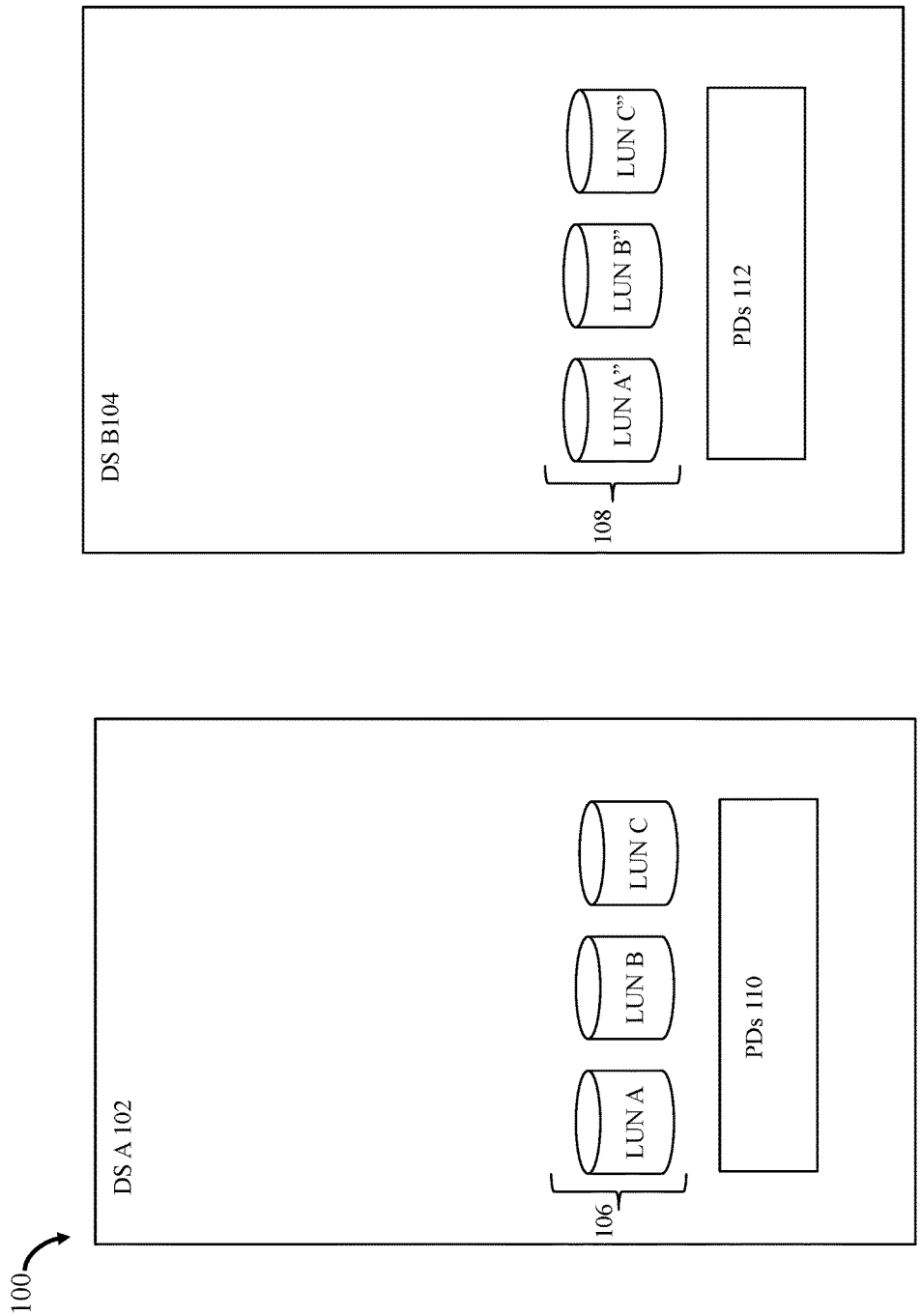
FIGS. 2, 3, 4, 5, and 6 illustrated processing steps that may be performed in an embodiment in accordance with techniques herein.

Referring to FIG. 2, shown is an example 100 illustrating a first step that may be performed in an embodiment in accordance with techniques herein. The example 100 includes a first site, also referred to as the source of local site 102 which in the example is data storage system (DS) A. The example 100 includes a second site, also referred to as the destination, target or remote site 104 which in the example is DS B. In the first step in connection with techniques herein, one or more LUNs, or more generally one or more logical devices, may be configured on both the local and remote sites 102 and 104. The LUNs configured on both 102 and 104 should match in terms of the number of LUNs and also the size or capacity of each LUN. For example, in this example 100, there are 3 LUNs A, B and C 106 created on DS A 102 and 3 LUNs A", B" and C" 108 created on DS B 104. Also, the sizes of each LUN match—size of LUN A of 106 matches size of LUN A" of 108; size of LUN B of 106 matches size of LUN B" of 108; and size of LUN C of 106 matches size of LUN C" of 108.

Each of the LUNs may be created as a logical entity by provisioning physical storage for the LUNs from PDs providing the back end non-volatile physical storage for the LUNs. For example, LUNs 106 of DS A 102 have their storage provisioned from one or more PDs 110, and LUNs 108 of DS B 104 have their storage provisioned from one or more PDs 112. In at least one embodiment, the LUNs of 106 and 108 may be characterized in one aspect as a thick LUN having its storage provisioned on creation of the LUN. Such a thick LUN may be contrasted with a thin or virtually provisioned LUN having different portions of its storage allocated on demand as writes are performed to different logical addresses of the LUN. Thus, in some systems, physical storage for thin LUNs may be provisioned from different PDs and may also be relocated to different PDs.

Figure 3:
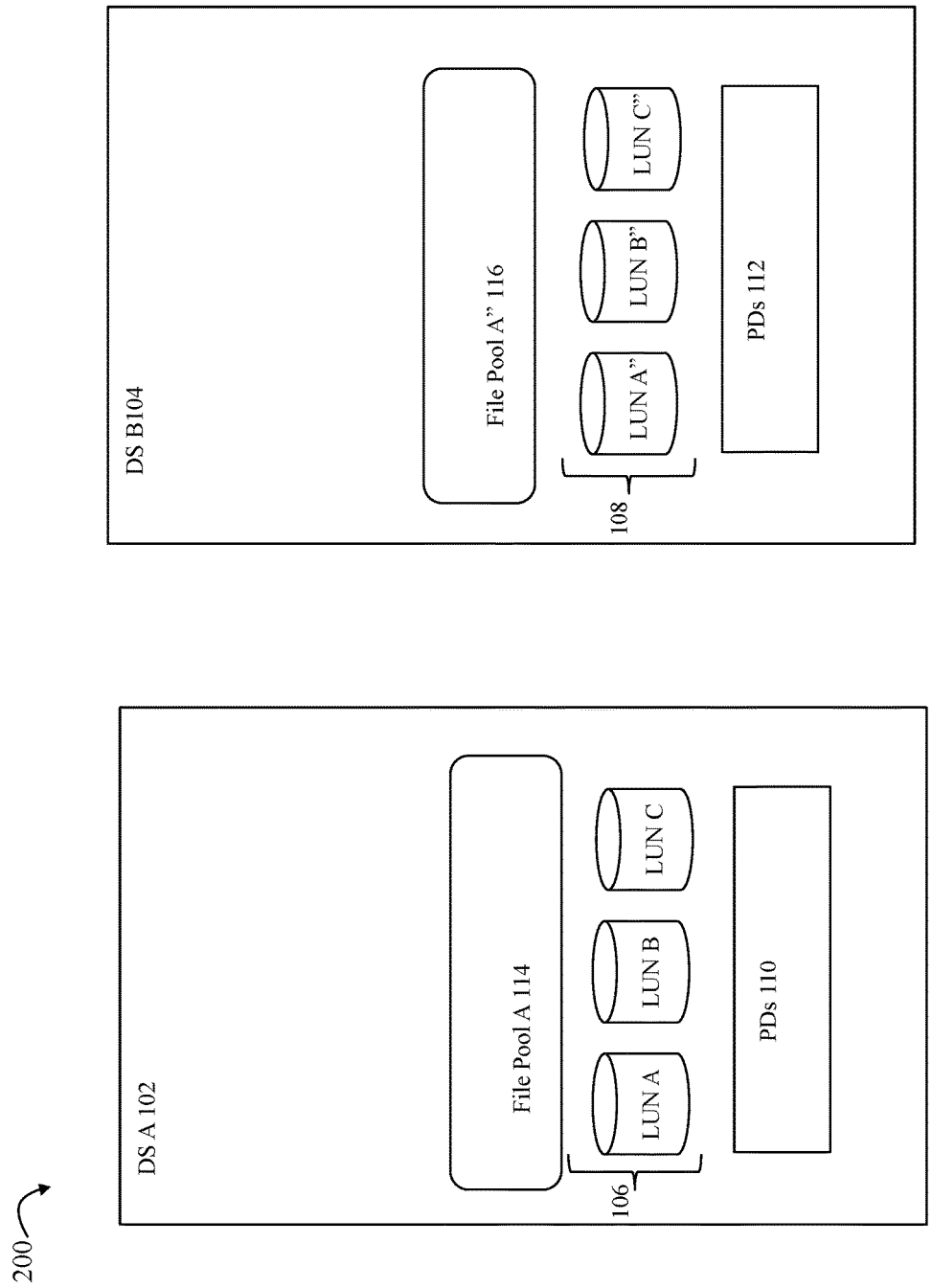

Subsequent to performing the first step as illustrated in FIG. 2, a second step may be performed as illustrated in FIG. 3.

Referring to FIG. 3, shown is an example 200 illustrating the second step that may be performed in an embodiment in accordance with techniques herein. In the second step, file pools are created on both the sites 102 and 104. The example 200 includes components as illustrated in FIG. 2 with the addition of file pool A 114 and file pool A" 116. The first file pool A 114 may be created on DS A 102 on top of the LUNs 106. In other words, the LUNs 106 provide the storage used for allocation with the file pool A 114. In a similar manner, the second file pool A" 116 may be created on DS B 104 on top of the LUNs 108. In other words, the LUNs 108 provide the storage used for allocation with the file pool A" 116. Consistent with discussion elsewhere herein, each of the file pools 114 and 116 may be self-contained in that any file system created therein cannot extend into another file pool. For example, a file system created in file pool A 114 cannot extend to another file pool also on DS A 102. In this manner, each file system may be completely and only contained within a single file pool. Additionally, each of the LUNs of 106 providing the storage for file pool 114 only provides storage for a single file pool (e.g., a single LUN may not be partitioned or separated into portions where different portions of the same LUN provide storage (are mapped to) multiple file pools). Thus, each LUN in 106 can only be mapped to the single file pool A 114, and each LUN in 108 can only be mapped to the single file pool A" 116.

Figure 4:
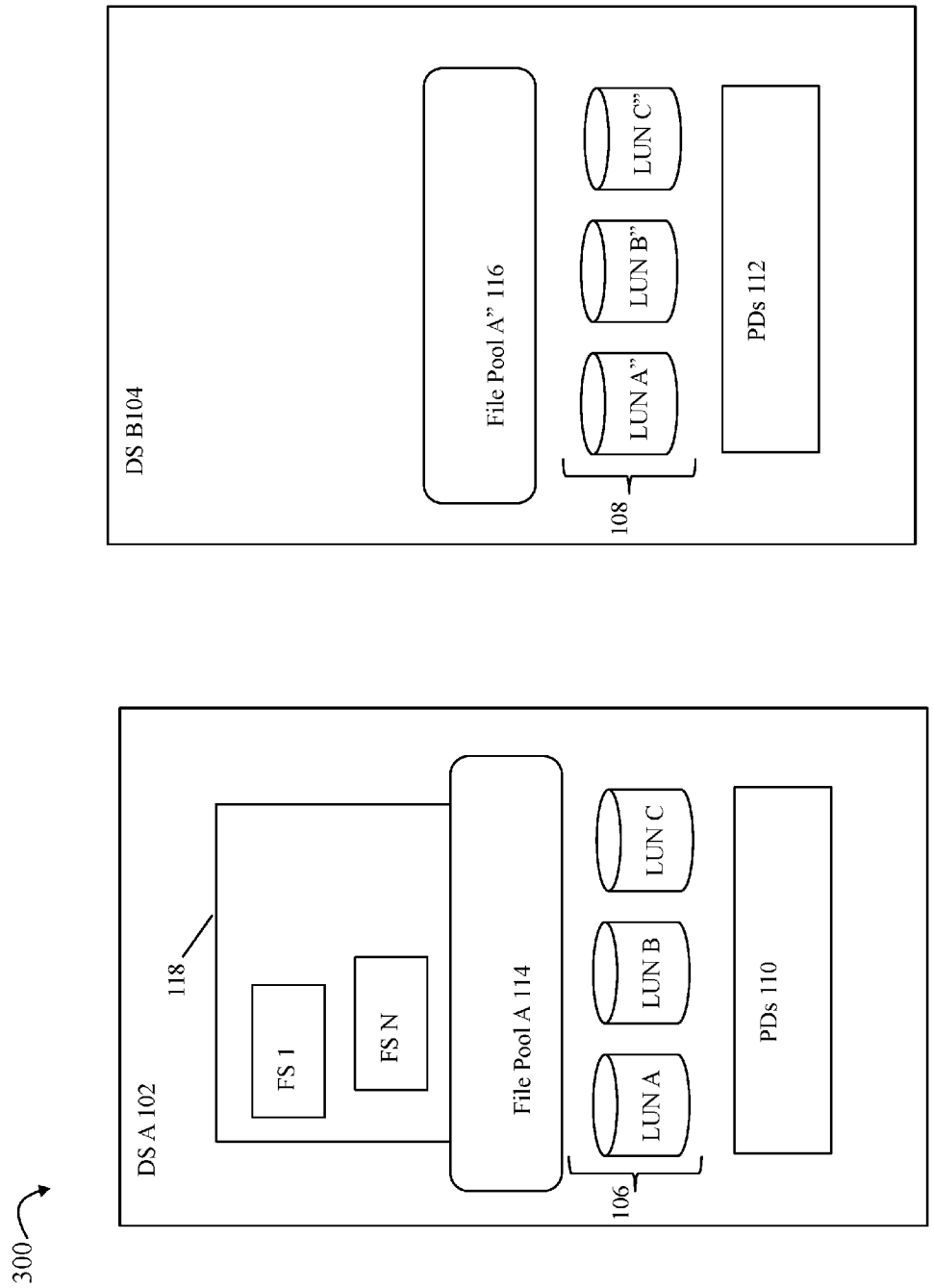

Subsequent to performing the second step as illustrated in FIG. 3, a third step may be performed as illustrated in FIG. 4.

Referring to FIG. 4, shown is an example 300 illustrating the third step that may be performed in an embodiment in accordance with techniques herein. In the third step, one or more self-contained file systems 118 (denoted as FS 1 through FS N) may be created in file pool A 114 of DS A 102.

Figure 5:
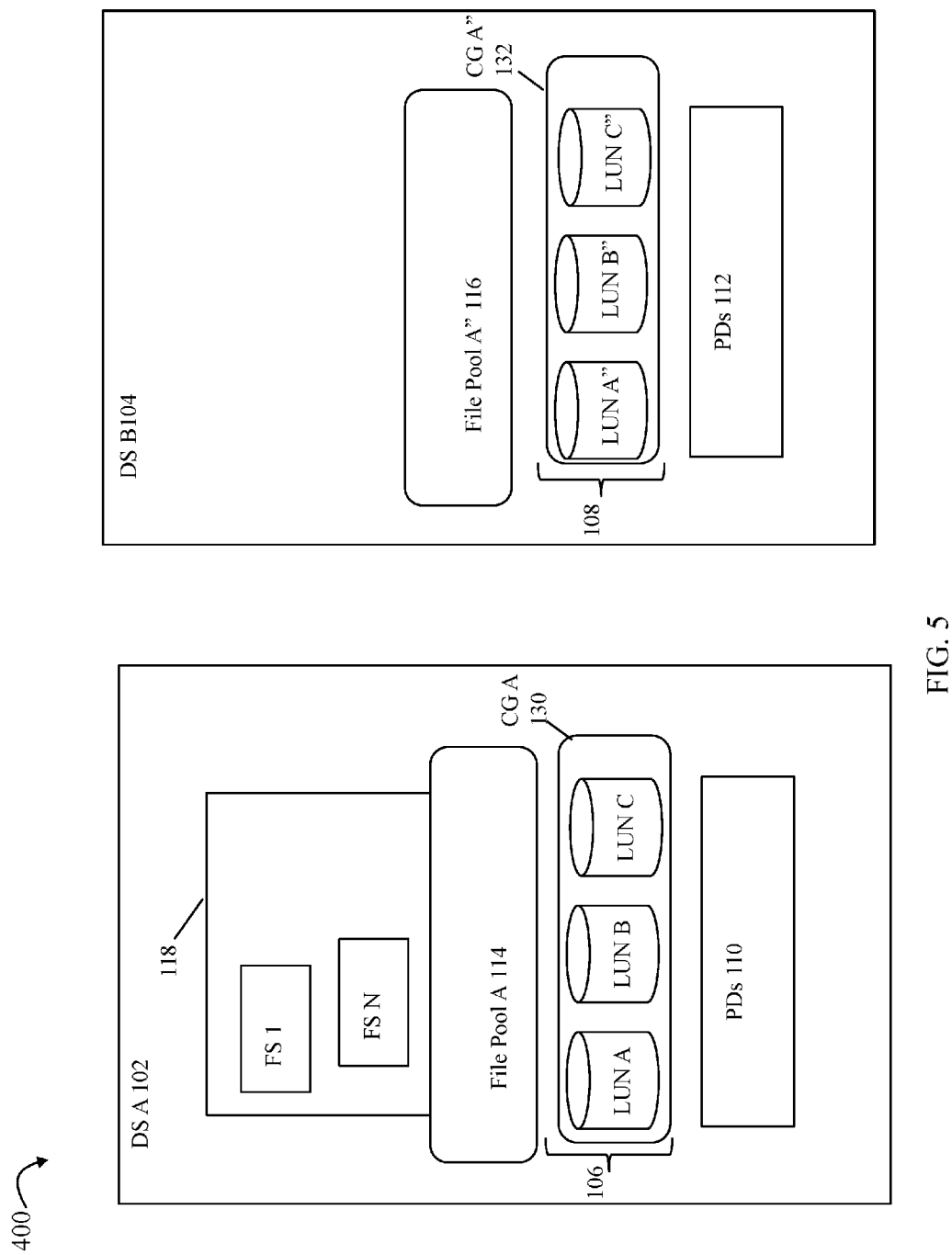

Subsequent to performing the third step as illustrated in FIG. 4, a fourth step may be performed as illustrated in FIG. 5.

Referring to FIG. 5, shown is an example 400 illustrating the fourth step that may be performed in an embodiment in accordance with techniques herein. In the fourth step, a first consistency group CG A 130 may be created for all the LUNs 106 providing storage for the file pool A 114. Thus, the example 400 illustrates the desired mapping between the file pool A 114 and the consistency group CG A 130. Also in the fourth step, a second consistency group CG A" 132 may be created for all the LUNs 108 providing storage for the file pool A" 116. Thus, the example 400 illustrates the desired mapping between the file pool A" 116 and the consistency group CG A" 132.

Figure 6:
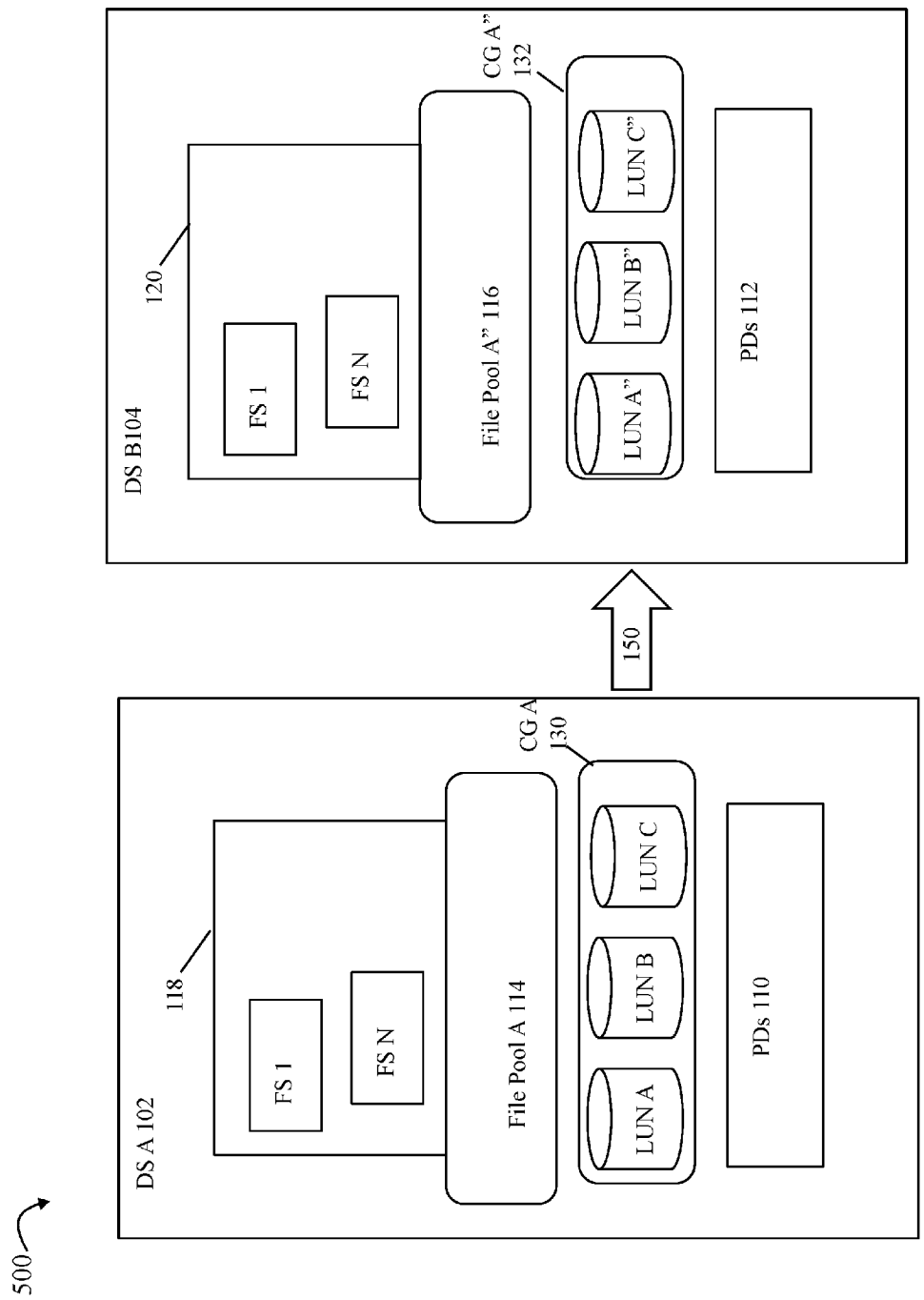

Subsequent to performing the fourth step as illustrated in FIG. 5, a fifth step may be performed as illustrated in FIG. 6.

Referring to FIG. 6, shown is an example 500 illustrating the fifth step that may be performed in an embodiment in accordance with techniques herein. In the fifth step, synchronized replication 150 may be established between the two consistency groups CG A 130 and CG A" 132. The particular details of establishing the synchronized replication between the consistency groups 130 and 132 may vary with the particular replication service or facility used in an embodiment. For example, establishing the synchronized replication may include identifying the particular consistency groups 130 and 132 and indicating that modifications, such as writes, to the first consistency group 130 are to be replicated in an ongoing manner whereby such modifications are applied to the second consistency group 132. Element 150 may denote the replication processing and link or connection between sites 102 and 104 used to transmit the modification operations, such as writes, which have been applied to CG A 130 and are then applied in a write consistent manner to CG A" 132.

Once the foregoing steps have been performed, modifications performed to CG A 130 may be replicated and thus applied to CF A" 132. As known in the art, a modification, such as a write to a file in FS 1 of DS A 102 results in a corresponding modification or write to a particular LUN address of location where the LUN is included in the CG A 130. More generally, the file systems 118 of DS A 102 have their storage allocated from LUNs of CG A 130 so that modifications made to the file systems 118 result in corresponding modifications to locations on one or more LUNs of CG A 130. In accordance with techniques herein, a write to a target location of a file/file system of 118 translates to a write on a particular LUN address or location mapped to the target location. The replication 150 provides for replicating the write performed at the LUN and consistency group 130 level to the consistency group 132.

In connection with the example 500, once the above-noted steps have been performed, the file systems 118 of file pool A 114 (e.g., FS 1 and FS N previously created in the above-noted third step of FIG. 4) are replicated on DS B 104 on file pool A" 116. Element 120 illustrates the replicated file systems FS 1 and FS N of file pool A" 116 on the second site DS B 104. In a similar manner, once replication has been established and this enabled for operation between the two consistency groups 130 and 132, any subsequent modifications made to file systems 118 (e.g., resulting in corresponding modifications to data of underlying LUNs of 130) are then replicated automatically in an ongoing manner to DS B 104. In particular, such modifications are applied in a write consistent manner to LUNs of 132 on DS B 104 (and thereby result in corresponding file pool and file system level entities of 116 and 120 reflecting the applied modifications).

Generally, the modifications made to elements 118 of the file pool A 114 may include, for example, new files and/or file systems created, write I/Os to an existing file/file system, file system extensions, operations that delete data of a file, delete a file, delete a file system, and the like. For example, as also described above, suppose a new file system FS M is created in 118 on file pool A 114. Creation of the new file system FS M results in writes or modifications to data stored on one or more LUNS of CG A 130. Replication processing 150 transmits the writes or data modifications from DS 102 to DS 104 where such writes are then applied in a write consistent manner to CG A" 132. Via the mapping defined between the CG A" 132 and file pool A" 116, the replicated writes applied to CG A" 132 denote replicated writes representing the creating of the new file system FS M also in 120 on file pool A" 116. In a similar manner, other modification operations, such as writing to a file/file system, creating a new file, extending an existing file or file system (e.g., extended to add more storage such as due to increase in file size) may be applied to the CG A 130, replicated from DS A 102 to DS B 104, and then applied in a write consistent manner to CG A" 132.

Although not illustrated in FIGS. 2-6, consistent with discussion elsewhere herein and as illustrated in FIG. 1, a host or other data storage system client may perform file-based operations, such as issue write I/Os to a file of 118 on the local DS A 102. More generally, such operations with respect to a file or file system may result in a modification to the file pool A 114 whereby such operations are replicated on the corresponding file pool A" 116 through the replication of such modifications between consistency groups of LUNs 130 and 132 providing the storage for the affected mapped file pools 114 and 116.

Figure 7:
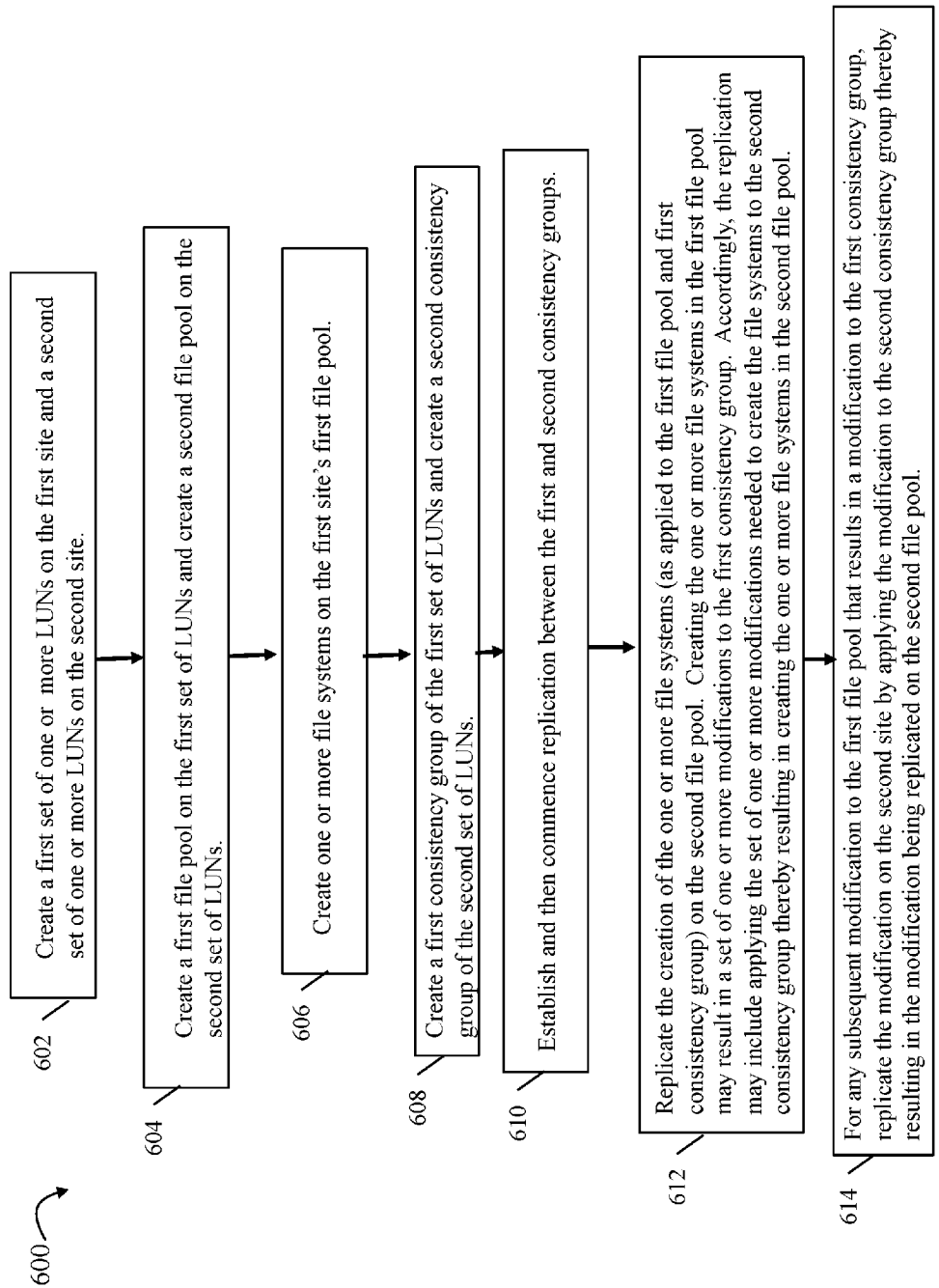
FIG. 7 is a flowchart of processing steps that may be performed in an embodiment in accordance with techniques herein.

Referring to FIG. 7, shown is a flowchart of processing steps that may be performed in an embodiment in accordance with techniques herein. The flowchart 600 summarizes processing as described above. At step 602, a first set of one or more LUNs is created on the first site and a second set of one or more LUNs is created on the second site. Step 602 is described above, for example, in connection with FIG. 2. At step 604, processing may be performed to create a first file pool on the first set of LUNs and create a second file pool on the second set of LUNs. Step 604 is described above, for example, in connection with FIG. 3. At step 606, processing may be performed to create one or more file systems on the first site's first file pool. Step 606 is described above, for example, in connection with FIG. 4. At step 608, processing may be performed to create a first consistency group of the first set of LUNs on the first site and also create a second consistency group of the second set of LUNs on the second site. Step 608 is described above, for example, in connection with FIG. 5. At step 610, processing may be performed to establish and then commence replication between the first and second consistency groups, respectively, of the first and second sites. At step 612, processing may be performed to replicate the creation of the one or more file systems (e.g., of step 606 in the first file pool and first consistency group) on the second file pool. Creating the one or more file systems in the first file pool in step 606 may result in a set of one or more modifications to the first consistency group. Accordingly, the replication may include applying the set of one or more modifications, needed to create the file systems in the first site's first file pool, to the second consistency group thereby resulting in creating the one or more file systems in the second file pool. Steps 610 and 612 are described above, for example, in connection with FIG. 6. At step 614, processing may be performed for any subsequent modification to the first file pool that result in a modification to the first consistency group of the first site. For any subsequent modification to the first file pool that results in a modification to the first consistency group, step 614 processing may replicate the modification on the second site by applying the modification to the second consistency group thereby resulting in the modification being replicated on the second file pool. Step 614 denotes the ongoing replication performed between the first and second consistency groups, respectively, of the first site and the second site.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing replication comprising:
configuring a first storage device group of a first plurality of logical devices of a first site as a first consistency group;
configuring a second storage device group of a second plurality of logical devices of a second site as a second consistency group;
creating a first file pool on the first site, wherein said creating the first file pool includes mapping the first pool to the first storage device group of the first plurality of logical devices configured as the first consistency group, wherein storage for said first file pool is provisioned from the first storage device group of the first plurality of logical devices configured as the first consistency group;
creating a second file pool on the second site, wherein said creating the second file pool includes mapping the second file pool to the second storage device group of the second plurality of logical devices configured as the second consistency group, wherein storage for said second file pool is provisioned from the second storage device group of the second plurality of logical devices configured as the second consistency group;
establishing replication processing between the first consistency group of the first plurality of logical devices of the first site and the second consistency group of the second plurality of logical devices of the second site;
performing writes to the first file pool;
applying the writes to the first consistency group; and
performing replication processing between the first consistency group of the first plurality of logical devices of the first site and the second consistency group of the second plurality of logical devices of the second site comprising:
replicating the writes on the second file pool, wherein said replicating includes applying the writes to the second consistency group.

2. The method of claim 1, wherein the first file pool includes one or more first file systems, each of said one or more first file systems being self-contained within only the first file pool whereby said each first file system does not extend into another file pool of the first site.

3. The method of claim 2, wherein the second file pool includes one or more second file systems, each of said one or more second file systems being self-contained within only the second file pool whereby said each second file system does not extend into another file pool of the second site.

4. The method of claim 1, wherein each of the writes to the first file pool results in modifying one or more portions of one or more storage devices of the first storage device group, said writes being applied to the first storage device group in a specified sequential ordering.

5. The method of claim 4, wherein said replicating maintains write consistency between the first consistency group and the second consistency group by applying the writes to the second storage device group in the specified sequential ordering.

6. The method of claim 1, wherein said replicating performs synchronous replication of the writes from the first consistency group to the second consistency group.

7. The method of claim 6, wherein the synchronous replication provides a same point in time copy of data in both the first consistency group and the second consistency group whereby the second storage device group mirrors the first storage device group.

8. The method of claim 1, wherein said replicating performs asynchronous replication of the writes from the first consistency group to the second consistency group.

9. The method of claim 8, wherein the asynchronous replication provides a first point in time copy of first data in the first consistency group and a second point in time copy of the first data in the second consistency group whereby the first storage device group includes a more recent up to date copy of the first data than the second storage device group.

10. The method of claim 1, wherein said replicating is included in remote replication performed between the first consistency group of the first site and the second consistency group of the second site.

11. The method of claim 10, wherein the first site is a first data storage system and the second site is a second data storage system.

12. The method of claim 1, further comprising:
creating a new file system in the first file pool; and
replicating the new file system in the second file pool by creating a copy of the new file system in the second file pool.

13. The method of claim 1, further comprising:
extending a first existing file system in the first file pool, wherein said extending includes allocating additional storage from the first storage device group for the first existing file system; and
replicating, in the second file pool, said extending of the first existing file system, wherein the second file pool includes a copy of the first existing file system and said replicating in the second file pool includes allocating additional storage from the second storage device group for the copy of the first existing file system.

14. The method of claim 1, further comprising:
performing an operation that results in a modification to the first file pool, wherein said operation includes any one or more of: creating a new file, creating a new file system, modifying an existing file, modifying an existing file system, deleting an existing file, deleting an existing file system, writing to an existing file, extending an existing file, extending an existing file system, and performing a file-based operation that results in the modification to the first file pool.

15. The method of claim 1, wherein the first plurality of logical devices has storage provisioned from a first plurality of physical devices of the first consistency group, wherein each logical device of the first plurality has all its provisioned storage included in the first plurality of physical devices of the first consistency group.

16. The method of claim 1, wherein the second plurality of logical devices has storage provisioned from a second plurality of physical devices of the second consistency group, wherein each logical device of the second plurality has all its provisioned storage included in the second plurality of physical devices of the second consistency group.

17. A system comprising:
a processor; and a memory comprising code stored thereon that, when executed, performs a method of data replication comprising:
configuring a first storage device group of a first plurality of logical devices of a first site as a first consistency group;
configuring a second storage device group of a second plurality of logical devices of a second site as a second consistency group;
creating a first file pool on the first site, wherein said creating the first file pool includes mapping the first pool to the first storage device group of the first plurality of logical devices configured as the first consistency group, wherein storage for said first file pool is provisioned from the first storage device group of the first plurality of logical devices configured as the first consistency group;
creating a second file pool on the second site, wherein said creating the second file pool includes mapping the second file pool to the second storage device group of the second plurality of logical devices configured as the second consistency group, wherein storage for said second file pool is provisioned from the second storage device group of the second plurality of logical devices configured as the second consistency group;
establishing replication processing between the first consistency group of the first plurality of logical devices of the first site and the second consistency group of the second plurality of logical devices of the second site;
performing writes to the first file pool;
applying the writes to the first consistency group; and
performing replication processing between the first consistency group of the first plurality of logical devices of the first site and the second consistency group of the second plurality of logical devices of the second site comprising:
replicating the writes on the second file pool, wherein said replicating includes applying the writes to the second consistency group.

18. A computer readable medium comprising code stored thereon that, when executed, performs a method of data replication comprising:
configuring a first storage device group of a first plurality of logical devices of a first site as a first consistency group;
configuring a second storage device group of a second plurality of logical devices of a second site as a second consistency group;
creating a first file pool on the first site, wherein said creating the first file pool includes mapping the first pool to the first storage device group of the first plurality of logical devices configured as the first consistency group, wherein storage for said first file pool is provisioned from the first storage device group of the first plurality of logical devices configured as the first consistency group;
creating a second file pool on the second site, wherein said creating the second file pool includes mapping the second file pool to the second storage device group of the second plurality of logical devices configured as the second consistency group, wherein storage for said second file pool is provisioned from the second storage device group of the second plurality of logical devices configured as the second consistency group;
establishing replication processing between the first consistency group of the first plurality of logical devices of the first site and the second consistency group of the second plurality of logical devices of the second site;
performing writes to the first file pool;
applying the writes to the first consistency group; and
performing replication processing between the first consistency group of the first plurality of logical devices of the first site and the second consistency group of the second plurality of logical devices of the second site comprising:
replicating the writes on the second file pool, wherein said replicating includes applying the writes to the second consistency group.

19. The computer readable medium of claim 18, wherein the first file pool includes one or more first file systems, each of said one or more first file systems being self-contained within only the first file pool whereby said each first file system does not extend into another file pool of the first site.

20. The computer readable medium of claim 19, wherein the second file pool includes one or more second file systems, each of said one or more second file systems being self-contained within only the second file pool whereby said each second file system does not extend into another file pool of the second site.

* * * * *